(12) United States Patent
McKenzie et al.

(10) Patent No.: US 11,609,571 B2
(45) Date of Patent: Mar. 21, 2023

(54) OPTIMIZED RECHARGING OF AUTONOMOUS VEHICLES

(71) Applicant: Ford Global Technologies, LLC, Dearborn, MI (US)

(72) Inventors: Matthew McKenzie, Berkley, MI (US); Vidhya Iyer, Sunnyvale, CA (US); Romil Shah, Santa Clara, CA (US); Anuja Shirsat, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 16/791,995

(22) Filed: Feb. 14, 2020

(65) Prior Publication Data

US 2021/0255633 A1    Aug. 19, 2021

(51) Int. Cl.
*G06Q 50/30* (2012.01)
*G01C 21/34* (2006.01)
(Continued)

(52) U.S. Cl.
CPC ....... *G05D 1/0217* (2013.01); *G01C 21/3407* (2013.01); *G01C 21/3469* (2013.01);
(Continued)

(58) Field of Classification Search
CPC ......... G05D 1/0217; G05D 2201/0212; G05D 2201/0213; G01C 21/3407;
(Continued)

(56) References Cited

U.S. PATENT DOCUMENTS 9,400,500 B2    7/2016    Delp
2009/0112393 A1*  4/2009  Maten .............. G01C 21/26
                                                              701/29.5
(Continued)

FOREIGN PATENT DOCUMENTS

DE          10105175 B4    8/2007

OTHER PUBLICATIONS

Pustišek, et al., "Blockchain Based Autonomous Selection of Electric Vehicle Charging Station," 2016 International Conference on Identification, Information and Knowledge in the Internet of Things (6 pages).

(Continued)

*Primary Examiner* — Jeffrey C Boomer
(74) *Attorney, Agent, or Firm* — Brandon Hicks; Eversheds Sutherland (LLP) US (57) ABSTRACT

The present disclosure relates to optimized recharging of autonomous vehicle. A device may request permission to recharge a vehicle during a trip. The device may receive, for a geographical zone, a first location associated with a first recharging station and a second location associated with a second recharging station. The device may generate a first driving route from a pick-up location with a stop at the first recharging station, and a second driving route from the pick-up location with a stop at the second recharging station. The device may assign a first value to the first driving route and a second value to the second driving route by way of an objective cost function. The device may generate driving directions corresponding to the first driving route.

18 Claims, 4 Drawing Sheets

(51) Int. Cl.
*G01C 21/36* (2006.01)
*G05D 1/02* (2020.01)

(52) U.S. Cl.
CPC ......... *G01C 21/3691* (2013.01); *G06Q 50/30* (2013.01); *G05D 2201/0212* (2013.01); *G05D 2201/0213* (2013.01)

(58) Field of Classification Search
CPC ............ G01C 21/3469; G01C 21/3691; G06Q 50/30; Y02T 90/16; Y02T 10/70; Y02T 10/7072; Y02T 90/12; B60L 53/66
See application file for complete search history.

(56) References Cited

U.S. PATENT DOCUMENTS

| | | | |
|---|---|---|---|
| 2011/0246061 A1* | 10/2011 | Hayashi | G01C 21/3469 701/533 |
| 2011/0288765 A1* | 11/2011 | Conway | G08G 1/096816 701/533 |
| 2013/0345976 A1* | 12/2013 | Li | G01C 21/3476 701/533 |
| 2015/0073636 A1* | 3/2015 | Machino | B60L 3/12 701/22 |
| 2015/0226572 A1* | 8/2015 | North | G01C 21/3682 701/400 |
| 2017/0323249 A1 | 11/2017 | Khasis | |
| 2018/0238698 A1* | 8/2018 | Pedersen | B60L 58/16 |
| 2018/0252539 A1* | 9/2018 | Yunoki | B60W 30/08 |
| 2019/0058342 A1 | 2/2019 | Jones et al. | |
| 2019/0197475 A1* | 6/2019 | Bianconcini | G06Q 10/0838 |
| 2019/0316924 A1* | 10/2019 | Morgan-Brown | G01C 21/3697 |
| 2020/0072626 A1* | 3/2020 | Kumar | G01C 21/3676 |
| 2021/0039513 A1* | 2/2021 | Konrardy | G07C 5/008 |

OTHER PUBLICATIONS

Xu, et al., "A Distance-Adaptive Refueling Recommendation Algorithm for Self-Driving Travel," ISPRS International Journal of Geo-Information 7, 94 (2018) (23 pages).

* cited by examiner

OPTIMIZED RECHARGING OF AUTONOMOUS VEHICLES

TECHNICAL FIELD

The present disclosure relates to autonomous vehicle navigation, and more particularly, to vehicle recharging time and location optimization.

BACKGROUND

Mobility on Demand (MoD) platforms match providers of on-demand transportation services to passengers through cloud-based computing platforms. Currently, MoD platforms typically equip providers with navigation information as to routes, fueling, traffic, weather, and the like to determine optimal routes.

U.S. Publication No. 2017/0323249 A1 (the '249 application) addresses route optimization when a recharging stop is desired. The algorithm described in the '249 application considers the appropriateness of the type of fueling station, fuel prices, fueling time, detour time, and detour distance before adding a recharging stop to a particular route. While the system described in the '249 application may compare recharging options, the system is directed to trucking and transportation of cargo, and does not include optimization options for use by Autonomous Vehicles (AVs) that account for user preferences, and cost and time constraints, which can make recharging optimization much more complex.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to optimize the cost of recharging an autonomous vehicle providing on-demand transportation services. As used herein "recharge" means to replenish the reserves of energy that the autonomous vehicle needs to move. Such energy can take the form of physical fuel or could take the form of an electric differential in a battery for electric vehicles. For the purposes of this disclosure a "recharging station" can include any location with infrastructure to recharge a vehicle, which may be an autonomous vehicle, a manually driven vehicle, or some combination of a user-operated and autonomously operated vehicle. With respect to a liquid fueled vehicle, a recharging station could be, for example, a gas station. For an electric vehicle, a recharging station could be or include a parking garage or other utility configured with electrical outlets or other charging infrastructure for recharging and/or replacing (e.g., swapping) vehicle battery cells, and/or a combination of fuel and power recharging, among other possibilities.

An AV may be used to transport passengers using one or more MoD platforms. Unlike driver-based ride sharing, in some aspects, AV vehicles may be refueled or recharged based upon various factors and characteristics including an amount of fuel or battery life remaining, based on trip characteristics, rider-approved variables, and other factors. While current systems can find the cheapest nearby fuel source upon the need to recharge, current AV's may be incapable of selecting recharge times and locations based upon other factors including available fuel prices within a predetermined geographical region and the AV fuel level required to reach the trip destination.

According to one or more embodiments, the system may include historical ride sharing data, recent trips that have been completed, and upcoming trips that are scheduled but not yet complete. The system may further include, as part of the recharging optimization, passenger input indicative of preferences associated with timing for the recharging operation, time associated with the recharging operation, a location and/or detour associated with the recharging operation, or other information that may impact the passenger's schedule as they complete their trip.

These and other advantages of the present disclosure are provided in greater detail herein.

Illustrative Embodiments

In the embodiments as described, the system may determine various geographical parameters in which the AV operates, such as a current location of the AV, an area of operation within which the AV is intended to operate, a distance the AV can travel within the assigned geographical region based on the current available fuel/charge level, and the like. The system may then acquire historical data for the AV, as well as for other AVs operating within a similar geographic region that may operate as part of a common AV fleet. The system may consider recent as well as future trips taken by this AV, both booked and predicted, to determine a geographical zone in which the AV can recharge. The system may then determine an optimal recharging time and location at which the AV may refuel or recharge. Further, if a trip will take the AV's fuel reserves below a designated level, the system may ask the passenger whether recharging can be conducted during the trip. Based upon the passenger input the system may select an appropriate algorithm to direct the AV to the most cost-effective recharging location.

In order to determine the optimal time and location for recharging, the system considers one or more factors, including a cost of recharging the vehicle, a distance to a recharging station, a distance to the final destination from the refueling point, time taken to recharge, an average gas or charge mileage of the vehicle, and/or a total distance the vehicle can travel when fully refueled or recharged. These factors are considered based upon a larger geographic region within which the AV operates and a geographic zone within the region where the AV is likely to be at the optimal time for recharging.

A geographical region, for the purposes of this disclosure, can include a location that an AV is assigned to work within, and can be defined in any way that an area containing roadways can be defined. For example, a geographical region could be a particular set of city limits, or could include a geographically-bound region within a predetermined radius of a particular landmark. For example, a predetermined radius may be 50 miles, 20 miles, 5 city blocks, 100 meters, etc. A geographical zone, for the purposes of this disclosure, may be defined as a subset of a geographical region. A geographical zone can be defined in any way a geographical area can be defined, with relation to the region it is a part of. For example, a geographical zone may be a particular district within the geographical region, or may be every point of the overarching geographical region within a predetermined distance of the autonomous vehicle. For example, the predetermined radius may be 50 miles, 20 miles, 5 city blocks, 100 meters, so long as the AV remains within the geographical region it is bound to.

In some embodiments, the present disclosure describes a computer operated system for optimizing the recharging operations of an AV. The system may start by determining the fuel level and whether the AV needs recharging. In one aspect, the AV may receive information as to a passenger pick-up location and intended destination. The distance from the AV to the pick-up location or from the pick-up location to the destination can be found by using a Global Positioning System (GPS) to determine the vehicle location, and then utilize a map of local roadways, such as Google Maps®, to determine a route. The route chosen is usually the shortest route, but many route determining algorithms take into account traffic patterns to select the shortest driving time, can be configured to avoid highways, road construction or other obstacles, or other such route options. The system then predicts the amount of fuel that would be required for the AV to reach the passenger pick-up location, as well as the fuel required to travel from the pick-up location to the destination, and determines whether the AV's current fuel level is sufficient to complete the journey. The system may also predict the amount of fuel that will be remaining once the journey is complete, and may save that value to a persistent memory location. The system then determines whether this predicted amount of remaining fuel is above some threshold value. The threshold value could be, for example, one quarter or one half of the maximum potential fuel for the vehicle. The system may also receive traffic data, weather data, hazard data, and/or other information for a geographical zone, and determine the threshold value indicative of a critical vehicle fuel level based on the traffic data, the weather data, and/or the hazard data. If the predicted amount is below that threshold value, then the AV may make a request of the passenger to authorize recharging of the vehicle during the trip, for example through a smartphone app.

If the passenger allows the AV to recharge during the journey, the AV may select a relevant geographical zone within the geographical region to search for refueling locations. Such a geographical zone could be, for example, any area within 3 miles of the previously determined shortest route between the passenger pick-up location and the intended destination. The AV may then search that geographical zone for recharging stations depending upon the type of fuel required by the vehicle. Such stations may be found in a variety of databases, for example GasBuddy®.

Such databases can include or provide an initial estimate for the price of recharging the AV. The processor may perform a cost analysis of the options found using the initial estimate for the price of recharging the AV and the deviation between the price estimate and the average price within the geographical region, as well as the distances between the pick-up location, the recharging location (within the geographical zone of the route) and the destination, the expected fuel level of the vehicle upon arriving at the destination, and/or the expected amount of time needed to recharge, among other variables. The system may store any predicted values for comparison with later recorded values to improve future predictions Once the AV has determined the minimum cost value obtainable from its available options, the system may create a route between the current AV location, the passenger pick-up location and the recharging station, and then the recharging station and the final destination. A processor may then enact the route.

Should the passenger decline to authorize recharging of the AV during the trip, the processor may perform an alternate cost optimization to determine a route that can compensate for the lack of recharging. The processor may, for example, limit the geographical zone for the route to a number of miles from the final first passenger destination, or select another route that is in between the first passenger destination and the next passenger scheduled pick-up location. The processor may then use this re-routing information to select the option found to have the lowest cost. The processor may then enact the new route and the AV can recharge prior to picking up new passengers.

The disclosure will be described more fully hereinafter with reference to the accompanying drawings, in which exemplary embodiments of the disclosure are shown, and not intended to be limiting.

Figure 1:
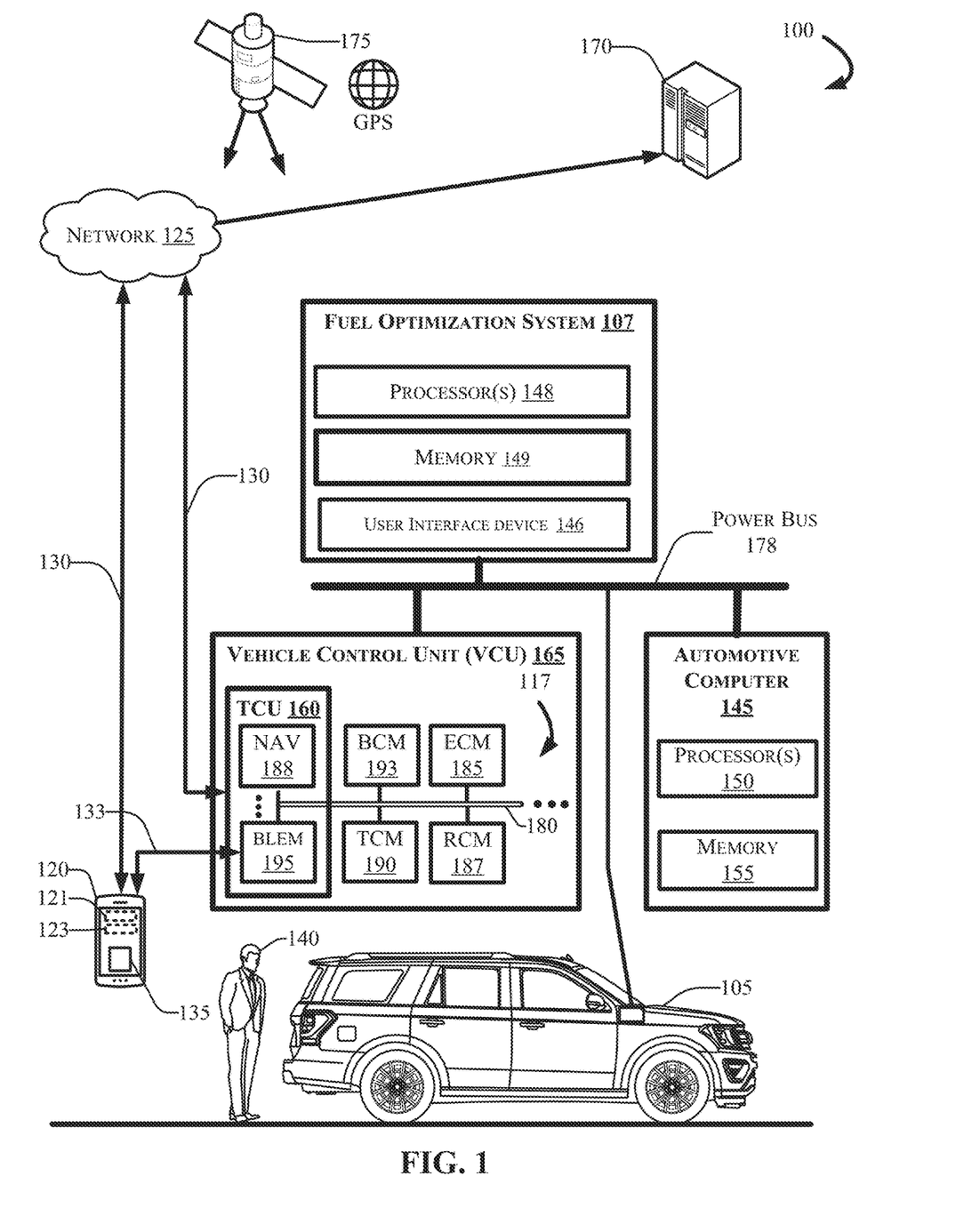
FIG. 1 depicts an example computing environment in which techniques and structures for providing the systems and methods disclosed herein may be implemented.

FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145 and a fuel optimization system 107. A mobile device 120, which may be associated with a passenger 140 and the vehicle 105, may connect with the automotive computer 145 using wired and/or wireless communication protocols and transceivers. One or more network(s) 125 may communicatively couple the vehicle 105 with the mobile device 120. The one or more network(s) 125 may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques. The vehicle 105 may also receive and/or be in communication with a Global Positioning System (GPS) 175.

The fuel optimization system 107 has one or more processor(s) 148, memory 149, and a user interface 146. The processor(s) 148 may utilize the memory 149 to store programs in code and/or to store data for performing aspects in accordance with the disclosure. The memory 149 may be a non-transitory computer-readable memory. The memory 149 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components. In one embodiment the mobile device memory 123 and/or computer-readable memory 155 are utilized to store the nature of the drive system in order to limit the search of recharging stations to relevant types.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 0 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

The mobile device 120 generally includes a memory 123 for storing program instructions associated with an application 135 that, when executed by a mobile device processor 121, performs aspects of the disclosed embodiments. In one embodiment, after determining recharging is required and instructions are sent through one or more channel(s) 130 to the mobile device 120, the application 135 is configured to request from the passenger 140 that recharging be allowed during the trip.

In some aspects, the mobile device 120 may communicate with the vehicle 105 through the one or more channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and via one or more direct connection(s) 133. The connection(s) 133 may include various low-energy protocols including, for example, Bluetooth®, BLE, or other Near Field Communication (NFC) protocols.

The fuel optimization system 107 may be in communication with the mobile device 120 through the application 135, which may provide the same information to the passenger 140 that is provided by the user interface 146. In the alternative, the mobile device 120 may provide through the application 135 additional requests to the passenger 140. In one embodiment, this additional request can be the request to allow vehicle recharging during the trip. In another embodiment, the request to recharge during the trip is made through the user interface 146. In yet another embodiment, both the user interface 146 and the mobile device 120 display the request to recharge during the trip.

The network(s) 125 illustrates an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The fuel optimization system 107 may be in communication with one or more server(s) 170 using network(s) 125. The server(s) provide the fuel optimization system 107 with information required to determine the optimal time and location for recharging. The one or more server(s) 170 may be services such as GasBuddy® and Google Maps®, providing geographical or financial information relevant to the fuel optimization system 107. Alternatively, the one or more server(s) 170 may be or include databases containing historical data captured by one or more AVs.

The vehicle 105 may include an engine compartment to house the automotive computer 145. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120.

The TCU 160 can be configured to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle CAN bus.

The VCU 165 may control various loads directly via the bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, and/or via wireless signal inputs received via the wireless channel(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is possible and contemplated that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The central BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a fuel optimization system 107 may integrate the system using, at least in part, the BCM 193.

The computing system architecture of the automotive computer 145 and VCU 165 may omit certain computing modules. It should be readily understood that the computing environment depicted in FIG. 1 is one example of a possible implementation according to the present disclosure, and thus, it should not be considered limiting or exclusive.

Figure 2:
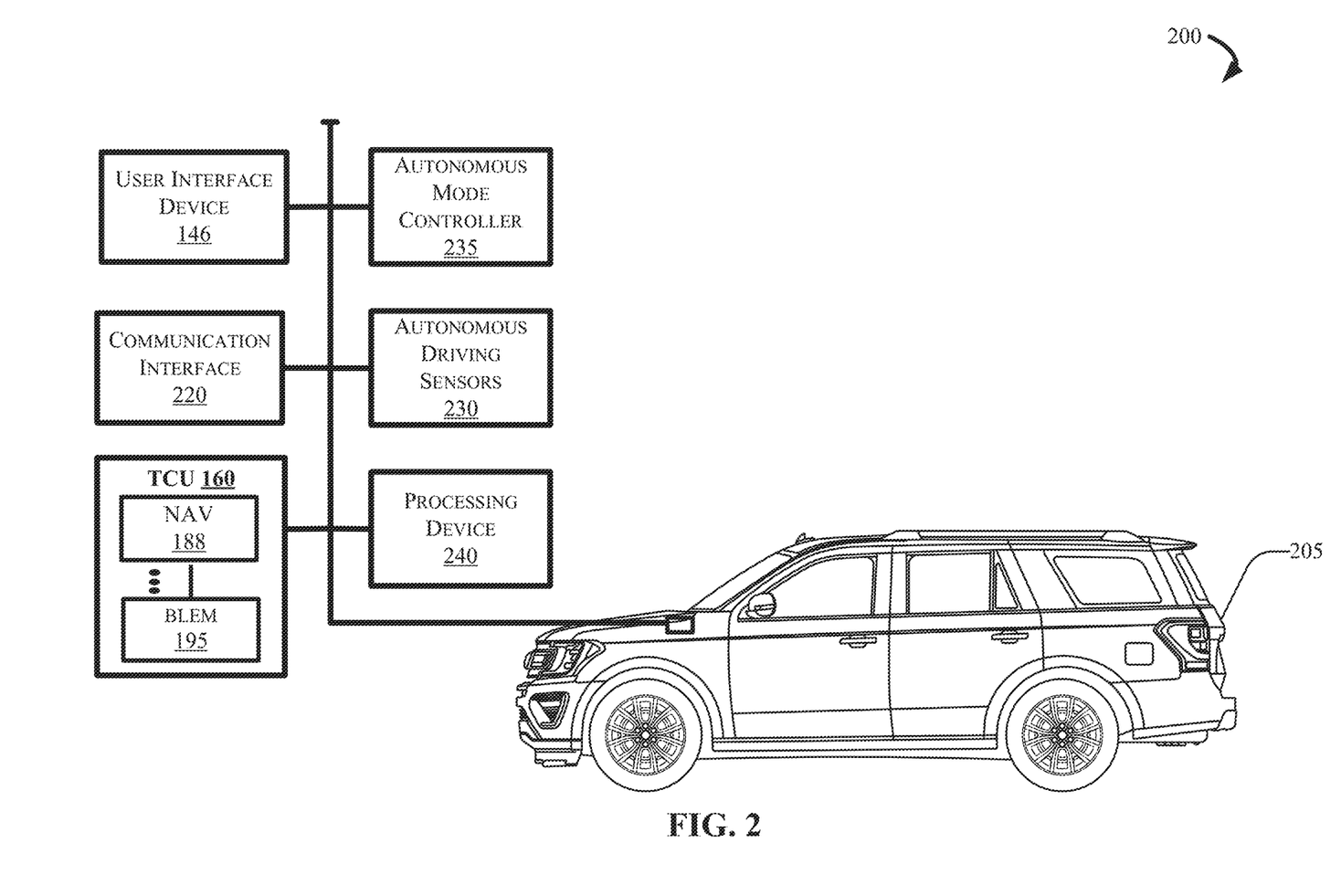
FIG. 2 depicts a functional schematic of an example control system that may be implemented for use in an autonomous vehicle in accordance with the present disclosure.

FIG. 2 illustrates an example functional schematic of a control system 200 that may be configured for use in the vehicle 205. The control system 200 can include a user interface device 146, a communication interface 220, a TCU 160 containing a NAV 188 and a BLEM 195, autonomous driving sensors 230, an autonomous mode controller 235, and one or more processing device(s) 240.

A user, such as, for example, the passenger 140 depicted with respect to FIG. 1, may receive information from a properly configured or programmed user interface 146. Moreover, the user may input information onto a user interface 146 that is properly disposed for viewing and properly configured and programmed. For example, in one embodiment where the vehicle 205 is a passenger vehicle, the passenger compartment may include the user interface 146. In another possible application, the user interface 146 may be attached to a control bar, handlebar steering wheel, or other operational mechanism that may be within tactile reach of a passenger or driver of the vehicle. In one possible approach, the user interface 146 may include a touch-sensitive display screen (not shown in FIG. 2). In one embodiment, the user interface 146 displays for the passenger the request to allow AV recharging during the trip.

The navigation system 188 may be configured and/or programmed to determine a position of the autonomous vehicle 105. The navigation system 188 may include a Global Positioning System (GPS) receiver configured or programmed to triangulate the position of the vehicle 105 relative to satellites or terrestrial based transmitter towers. The navigation system 188, therefore, may be configured or programmed for wireless communication. The navigation system 188 may be further configured or programmed to develop routes from a current location to a selected destination, as well as display a map and present driving directions to the selected destination via, e.g., the user interface 146. In some instances, the navigation system 188 may develop the route according to a user preference. Examples of user preferences may include maximizing fuel efficiency, reducing travel time, travelling the shortest distance, or the like.

The communication interface 220 may be configured or programmed to facilitate wired and/or wireless communication between the components of the vehicle 105 and other devices, such as a remote server (not shown in FIG. 2), or another vehicle (not shown in FIG. 2) when using a vehicle-to-vehicle communication protocol. The communication interface 220 may also be configured and/or programmed to communicate directly from the vehicle 105 to the mobile device 120 using any number of communication protocols such as Bluetooth®, Bluetooth® Low Energy, or Wi-Fi.

The communication interface 220 may also communicate using one or more vehicle-to-vehicle communications technologies. An example of a vehicle-to-vehicle communication protocol may include, for example, a dedicated short-range communication (DSRC) protocol. Accordingly, the communication interface 220 may be configured or programmed to receive messages from and/or transmit messages to a remote server (e.g., the server(s) 170 depicted with respect to FIG. 1) and/or other autonomous, semi-autonomous, or manually-driven vehicles (not shown in FIG. 2).

The autonomous driving sensors 230 may include any number of devices configured or programmed to generate signals that help navigate the vehicle 105 while the vehicle 105 is operating in the autonomous (e.g., driverless) mode. Examples of autonomous driving sensors 230 may include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like. The autonomous driving sensors 230 may help the vehicle 105 "see" the roadway and the vehicle surroundings and/or negotiate various obstacles while the vehicle is operating in the autonomous mode.

The autonomous mode controller 235 may be configured or programmed to control one or more vehicle subsystems while the vehicle is operating in the autonomous mode. Examples of subsystems that may be controlled by the autonomous mode controller 235 may include one or more systems for controlling braking, ignition, steering, acceleration, transmission control, and/or other control mechanisms. The autonomous mode controller 235 may control the subsystems based, at least in part, on signals generated by the autonomous driving sensors 230.

In one example embodiment, the system 107 may generate driving directions based upon routes determined to have a lowest value assigned using an objective cost function. An objective cost function may be one or more algorithms configured to analyze information relating to the cost of using a particular recharging station.

In one embodiment, an objective cost function may receive inputs associated with fuel price, vehicle fuel usage (efficiency), respective distances between fuel stations, present location of the vehicle, and other possible information that may be used in conjunction with a target destination, to determine an optimized travel path and recharging location that optimizes a predetermined parameter such as cost and/or time.

In one embodiment, the equation has four terms that are added together. The distance traveled, the price of fuel last paid, and the average fuel efficiency of the vehicle 105 may all control the value of a first term. If the price of fuel, measured in dollars per gallon for example, is divided by the average fuel efficiency of the vehicle 105, measured in miles per gallon for example, then the price paid per mile of travel is identified. If this price per mile is multiplied by the distance traveled, measured in miles for example, then the amount paid to travel that distance is obtained. In another embodiment a first distance traveled before recharging, and a second distance traveled after may control the value of a second term. Two different recharging costs, the amount paid at the first, earlier recharging, and the amount paid at the second, most recent recharging, may also affect the value of the second term. If the first price and first distance are combined as described above, and the second price and second distance are combined as described above, the pre-recharging price and post recharging price of travel are obtained. These can be added together to arrive at a total cost for travel.

For example, if one assumes these values are denoted as:

The previous price paid per mile of travel to recharge the AV (referred to as "P1");

The price per mile of travel to recharge the AV (referred to as "P2");

The number of miles from the pick-up point to the recharging station (referred to as "D1"; and The number of miles from the recharging station to the intended destination (referred to as "D2").

In one embodiment, the deviation from the average gas or charge price in the region may control the value of a third term. The fuel optimization system 107 may request the average gas or charge price in the region from server(s) 170 over network 125. The server(s) 170 can provide this price based on information collected by other AV's, or aggregated from another service such as GasBuddy®. The system then subtracts the price paid at the recharging station from the average gas or charge price in the region. The result may be the degree to which the price paid deviates from the average price.

When writing the equation, these values are denoted as:

The average gas or charge price for recharging in the geographical zone that the AV is confined to: G.

In one embodiment, the amount of gas or charge that is estimated to be remaining in the tank at the end of the trip may affect the value of a term. The system may record into memory 155 the maximum travel distance that the vehicle 105 is capable of when fuel is full. The system may then subtract the distance traveled since recharging and obtain the number of miles the vehicle 105 will still be able to travel after the trip.

For example, if one assumes that the maximum travel distance is approximately 350 miles with full fuel. Thus, the term is denoted as the number of miles remaining after arriving at the intended destination, assuming 350 miles when fully fueled, is 350-D2.

In one embodiment, one term may be associated with the length of time for recharging the vehicle. The system can measure the time it takes to recharge, and the system may use these records to predict future recharging times.

Accordingly, the system may determine a total time taken for the trip, a sum of the time from pick-up until the arriving at the recharging station, the time required to recharge, and the time from the recharging station to the intended destination.

The system may add the respective terms together, and apply a weight to one or more of the terms. These four weights are all capable of being different values. Weights are learned through optimizing the cost function, a process well understood in the art. These weight optimizations allow for consideration of different circumstances. For example, the weight of one term may be higher during peak business hours, and decrease outside of those hours. Because the weights multiply the term, altering the weights affects the degree to which the term changes the outcome, making that term more important as the weight increases, and less important as it decreases.

When writing the equation, the four weights are denoted as $\alpha$, $\beta$, $\gamma$ and $\phi$.

The final equation can be written:

$$\text{Cost} = \alpha^*(D_1^*P_1 + D_2^*P_2) + \beta^*(G-P_2) + \gamma^*(350-D_2) + \phi^*$$

Figure 3A:
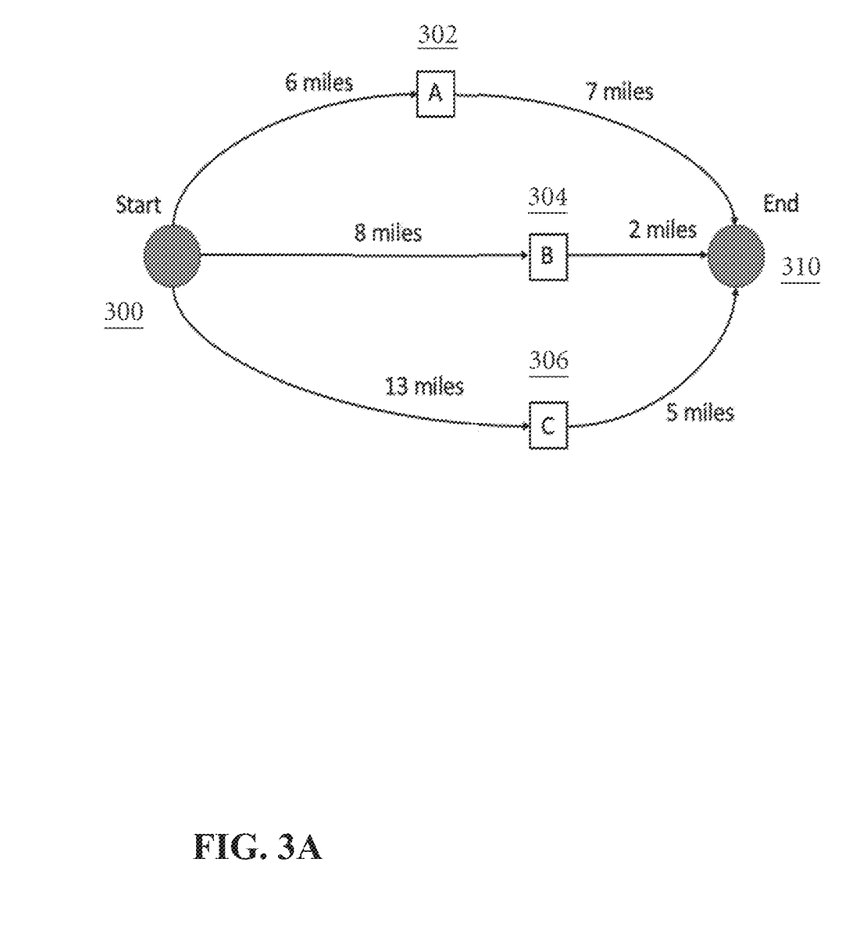
FIG. 3A illustrates example routes in accordance with the present disclosure.

FIG. 3A illustrates an example cost function analysis that the fuel optimization system 107 may use to evaluate the relative desirability of different route options. FIG. 3A depicts three possible choices for recharging stations, which may include Station A 302, Station B 304, and Station C 306) that may be positioned along alternative routes between a pick-up location 300 and the destination 310, and the passenger has allowed mid-trip recharging. It should be appreciated that any number of recharging stations may be included in an operating environment. For example, there may be fewer than three or more than three recharging stations.

In one example embodiment, the fuel optimization system 107 may receive data indicative of the one or more locations including the Station A 302, the Station B 304, and the Station C 306, including their location, and/or their hours of operation. The fuel optimization system 107 may also receive data indicative of respective prices for the recharging stations. For example, location A 302 may be a gas station offering gas at a first fixed cost of $3 per gallon. In another example, location A 302 may be a parking garage with access to a charging station that charges a fixed cost of $0.1 per kWh. For the purposes of this example, the following are assumed: The average fuel cost in the geographical region is $2.5 per gallon.

The fuel optimization system 107 may further include data indicative of characteristics of the vehicle in the determination of an optimized route. For example, the fuel optimization system 107 may include predetermined information associated with a fuel capacity, a charging capacity, a vehicle mileage per unit of energy, and the like. For the purposes of this example, the tank of the vehicle 105 can hold 14 gallons, and the vehicle 105 averages 25 miles of travel per gallon of gas.

The fuel optimization system 107 may use recharging and driving route information that indicates respective driving routes, and other information to optimize selection of a recommended driving route. The costs of gas differ in the three recharging stations in this example. In both examples, the recharging station labeled A 302 sells gas for $3 a gallon, the recharging station labeled B 304 sells gas for $3.1 a gallon, and the recharging station C 306 sells gas for $2.9 a gallon. For the sake of illustration, the weight values $\alpha$, $\beta$, $\gamma$ and $\phi$ are assumed to be 1, 1, (1/350), and 0, respectively. However, in actuality these weights would be based upon the optimization of the cost function based upon historical data collected by the AV. The values P1 and P2 are calculated using an assumed value of 25 miles of travel per gallon of gas. As such P1 and P2 are obtained by dividing the per gallon price of gas at the station by 25 miles per gallon, resulting in a per mile traveled price of gas.

In this present example then, the equations would be as follows:

$$\text{Cost } A = 1.92 = (1.44) + (-0.5) + (0.98)$$

$$\text{Cost } B = 1.43 = (1.04) + (-0.6) + (0.99) \text{Cost } C = 2.49 = (1.9) + (-0.4) + (0.99)$$

The system may determine the respective Costs A, B, and C, and select an optimal route associated with one of the evaluated options A-C for recharging. In the present example, the Station B analysis provides an optimized route, because the relative cost for obtaining the fuel at Station B is the lowest of all of the options considered.

Figure 3B:
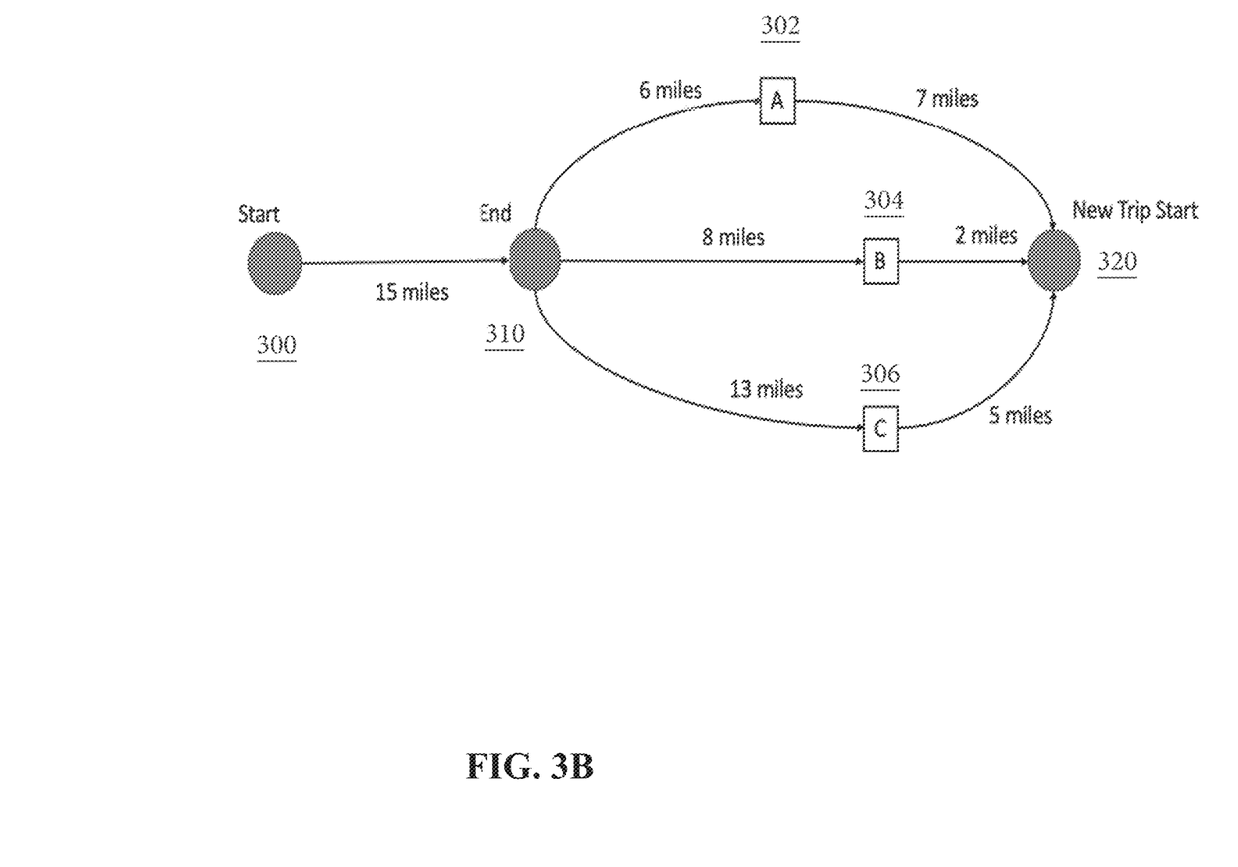
FIG. 3B illustrates another example of routes in accordance with the present disclosure.

FIG. 3B illustrates the same example, except that the passenger has indicated that recharging cannot take place during the trip. One advantage of embodiments described herein includes alteration of the objective cost function based on user input during the trip. The user input indicative of whether or not the vehicle 105 may recharge during a particular trip may alter the objective cost function used to determine the navigational path. According to an example embodiment, the price of travel may be associated with a length of the trip taken, a price per mile previously paid to recharge, and/or a distance to the recharging station given a present location of the vehicle 105 en route. The system 107 may evaluate these input values, and determine the navigational path by determining that a sum of the input values, and the price per mile given a particular fuel choice, will result in an optimized cost minimization as the vehicle 105 determines the optimal path to the prospective recharging stations. After the recharge, the system multiplies the price per mile paid at the recharging station by the distance to the next pick-up location 320 in order to arrive at a cost of travel to the pick-up. Adding these two costs together may result in a total cost for the travel.

Considering a mathematical approach to the cost function, in one embodiment the system 107 may estimate a cost for a particular option using the following algorithm, where, $$Cost=\alpha*((D_0+D_1)*P_1+D_2*P_2)+\beta*(G-P_2)+\gamma*(350-D_2)+\phi*T.$$

In the cost function above, the variables may include:

D0, which may be associated with a number of miles from the pick-up point to the intended destination;

D1 may represent the number of miles from the intended destination to the recharging station;

D2 can represent the number of miles from the recharging station to the next pick-up point; and the values $\alpha$, $\beta$, $\gamma$ and $\phi$ represent respective weights associated with one term of the optimized cost function. The weight values are determined over time by minimizing the cost function in a manner well understood in the art.

Accordingly, the system 107 may apply the cost values for the respective options A, B, and C, to determine a minimized cost give the available choices at hand. For example, the system may evaluate for respective costs, such that $$Cost\ A=3.42=(2.94)+(-0.5)+(0.98);$$

$$Cost\ B=2.93=(2.54)+(-0.6)+(0.99);\text{ and}$$

$$Cost\ C=3.99=(3.4)+(-0.4)+(0.99).$$

The system 107 may determine, once again, that recharging station B is the most cost-effective stop in this scenario, and the AV would route the trip accordingly.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method comprising:
 requesting, by a processor, passenger permission to recharge, wherein the recharging occurs during a trip;
 receiving, for a geographical zone, a first location associated with a first recharging station and a second location associated with a second recharging station;
 generating a first driving route from a pick-up location with a stop at the first recharging station, and a second driving route from the pick-up location with a stop at the second recharging station;
 assigning a first value to the first driving route and a second value to the second driving route by way of an objective cost function, wherein the objective cost function comprises a weighted function based at least in part on a historical price to recharge, a first price to recharge along the first driving route, a second price to recharge along the second driving route, a first plurality of distances associated with the first driving route, and a second plurality of distances associated with the second driving route;
 determining that the first value is a lower value than the second value;

generating driving directions corresponding to the first driving route using the first value based on the determination that the first value is lower than the second value; and autonomously navigating the first driving route by a vehicle, wherein the vehicle is an autonomous vehicle.

2. The computer-implemented method according to claim 1, wherein the driving directions direct the vehicle to drive from the pick-up location to a destination, followed by directing the vehicle to drive from the destination to the first recharging station.

3. The computer-implemented method according to claim 1, further comprising:
generating a third driving route between the pick-up location and a destination;
predicting a fuel level available at an end of the third driving route;
determining that the predicted fuel level is less than or equal to a threshold value; and
requesting, responsive to the determination that the predicted fuel level is less than or equal to the threshold value, the passenger permission to recharge.

4. The computer-implemented method according to claim 1, further comprising:
receiving, for a geographical zone, at least one of traffic data, weather data, and hazard data; and
determining a critical vehicle fuel level based on the traffic data, the weather data, and the hazard data.

5. The computer-implemented method of claim 4, further comprising:
generating a third driving route between the pick-up location and a destination;
predicting a fuel level available at an end of the third driving route; and
determining whether the predicted fuel level is equal to or below the critical vehicle fuel level.

6. The computer-implemented method according to claim 1, further comprising:
determining an average fuel price in a geographical zone; and
assigning the vehicle to work within a geographical region, and wherein the geographical zone is a subset of the geographical region.

7. The computer-implemented method according to claim 6, wherein the objective cost function utilizes a deviation from the average fuel price to assign the first value to the first driving route and the second value to the second driving route.

8. The computer-implemented method according to claim 1, further comprising:
receiving a third price associated with the first recharging station and a fourth price associated with the second recharging station,
wherein the objective cost function utilizes the third price to assign the first value and the fourth price to assign the second value.

9. A system, comprising:
a processor; and
a memory for storing executable instructions, the processor configured to execute the instructions to:
request permission to recharge a vehicle, wherein the vehicle is recharged during a trip;
receive, for a geographical zone, a first location associated with a first recharging station and a second location associated with a second recharging station;
generate a first driving route from a pick-up location with a stop at the first recharging station, and a second driving route from the pick-up location with a stop at the second recharging station;
assign a first value to the first driving route and a second value to the second driving route by way of an objective cost function, wherein the objective cost function comprises a weighted function based at least in part on a historical price to recharge, a first price to recharge along the first driving route, a second price to recharge along the second driving route, a first plurality of distances associated with the first driving route, and a second plurality of distances associated with the second driving route;
determine that the first value is a lower value than the second value;
generate driving directions corresponding to the first driving route using the first value based on the determination that the first value is lower than the second value; and
autonomously navigate the first driving route by a vehicle, wherein the vehicle is an autonomous vehicle.

10. The system according to claim 9, wherein the driving directions direct the vehicle to drive from the pick-up location to a destination, followed by directing the vehicle to drive from the destination to the first recharging station.

11. The system according to claim 9, wherein the processor is further configured to execute the instructions to:
generate a third driving route between the pick-up location and a destination;
predict a vehicle fuel level available at an end of the third driving route;
determine that the predicted fuel level is less than or equal to a threshold value; and
requesting, responsive to the determination that the predicted fuel level is less than or equal to the threshold value, the passenger permission to recharge.

12. The system according to claim 9, wherein the processor is further configured to execute the instructions to:
receive for a geographical zone at least one of traffic data, weather data, and hazard data,
determine a critical vehicle fuel level based on the traffic data, the weather data, and the hazard data.

13. The system according to claim 12, wherein the processor is further configured to execute the instructions to:
generate a third driving route between the pick-up location and a destination;
predict a vehicle fuel level available at an end of the third driving route; and
determine whether the predicted vehicle fuel level is equal to or below the critical vehicle fuel level.

14. The system according to claim 9, wherein the processor is further configured to execute the instructions to:
determine an average fuel price in a geographical region; and
assign the vehicle to work within a geographical zone, and wherein the geographical zone is a subset of the geographical region.

15. The system according to claim 14, wherein the objective cost function utilizes a deviation from the average fuel price to assign the first value to the first driving route and the second value to the second driving route.

16. The system according to claim 9, wherein the processor is further configured to execute the instructions to:
receive a third price associated with the first recharging station and a fourth price associated with the second recharging station, wherein the objective cost function utilizes the third price to assign the first value and the fourth price to assign the second value.

17. A non-transitory computer-readable storage medium in an autonomous vehicle, the computer-readable storage medium having instructions stored thereupon which, when executed by a processor, cause the processor to:
 request passenger permission to recharge, wherein the recharging occurs during a trip;
 receive, for a geographical zone, a first location associated with a first recharging station and a second location associated with a second recharging station;
 generate a first driving route from a pick-up location with a stop at the first recharging station, and a second driving route from the pick-up location with a stop at the second recharging station;
 assign a first value to the first driving route and a second value to the second driving route by way of an objective cost function, wherein the objective cost function comprises a weighted function based at least in part on a historical price to recharge, a first price to recharge along the first driving route, a second price to recharge along the second driving route, a first plurality of distances associated with the first driving route, and a second plurality of distances associated with the second driving route;
 determine that the first value is a lower value than the second value;
 generate driving directions corresponding to the first driving route using the first value based on the determination that the first value is lower than the second value; and
 autonomously navigate the first driving route by a vehicle, wherein the vehicle is an autonomous vehicle.

18. The non-transitory computer-readable storage medium according to claim 17, wherein the driving directions direct the vehicle to drive from the pick-up location to a destination, followed by directing the vehicle to drive from the destination to the first recharging station.

* * * * *